United States Patent
Vass, Jr.

(10) Patent No.: US 6,364,261 B1
(45) Date of Patent: Apr. 2, 2002

(54) CORNER MOUNTING BRACKET

(76) Inventor: Emery Vass, Jr., RR#1, S80, C18, Keremeos, British Columia (CA), V0X 1N0

( * ) Notice: Subject to any disclaimer, the term of this patent is extended or adjusted under 35 U.S.C. 154(b) by 0 days.

(21) Appl. No.: 09/567,137

(22) Filed: May 8, 2000

Related U.S. Application Data

(60) Provisional application No. 60/147,483, filed on Aug. 9, 1999.

(51) Int. Cl.⁷ ............................................. A47B 96/06
(52) U.S. Cl. ................................. 248/220.1; 428/542.4
(58) Field of Search ............................. 248/220.1, 549, 248/475.1, 489, 235, 239, 498, 497, 339, 241; 428/542.4

(56) References Cited

U.S. PATENT DOCUMENTS

| | | | |
|---|---|---|---|
| 505,230 A | * | 9/1893 | Robinson ............. 248/220.1 X |
| 1,575,270 A | | 3/1926 | Jankowsky |
| 1,922,935 A | | 8/1933 | Du Bois |
| 2,096,024 A | | 10/1937 | Anderson |
| 2,182,600 A | | 12/1939 | Spetz et al. |
| 2,219,975 A | | 10/1940 | Bentz |
| 2,254,847 A | | 9/1941 | Holt |
| 2,289,451 A | | 7/1942 | Porcelli |
| 2,389,349 A | | 11/1945 | Eastman |
| 3,014,596 A | | 12/1961 | Gingher et al. |
| 3,692,265 A | | 9/1972 | Barriger |
| D225,506 S | * | 12/1972 | Priore ..................... D8/72 |
| 4,049,225 A | | 9/1977 | Chasen et al. |
| 4,464,440 A | | 8/1984 | Dotzman |
| 4,640,491 A | * | 2/1987 | Grist et al. ................. 249/219 |
| 4,717,626 A | | 1/1988 | Badger |
| 4,727,815 A | * | 3/1988 | Miller ......................... 108/42 |
| 5,042,766 A | | 8/1991 | Baker |
| 5,085,398 A | * | 2/1992 | Holcomb et al. ............. 249/24 |
| 5,094,421 A | | 3/1992 | Zaccone |
| 5,154,384 A | | 10/1992 | Owens |
| 5,205,524 A | * | 4/1993 | Cohen ........................ 248/235 |
| 5,513,575 A | | 5/1996 | Slade |
| 5,810,317 A | | 9/1998 | Macchi |
| 6,015,123 A | * | 1/2000 | Perez et al. ............... 248/220.1 |

FOREIGN PATENT DOCUMENTS

EP 0665127 8/1995

* cited by examiner

Primary Examiner—Ramon O. Ramirez
Assistant Examiner—A. Joseph Wujciak, III
(74) Attorney, Agent, or Firm—Antony C. Edwards

(57) ABSTRACT

The corner mounting bracket of the present invention includes a V-shaped elongate base for mounting snugly into an inner corner of a room and a rigid cantilevered member rigidly mounted to the base. The base is elongate between first and second opposite ends. It is generally V-shaped in cross-section perpendicular to a longitudinal axis of the base extending along a vertex of the V-shape. The rigid cantilevered member is rigidly mounted to the base adjacent the first end of the base so as to extend therefrom generally perpendicularly to the longitudinal axis and so as to bisect the V-shape. A distal end of the cantilevered member is adapted for hanging articles therefrom.

15 Claims, 2 Drawing Sheets

CORNER MOUNTING BRACKET

CROSS REFERENCE TO RELATED APPLICATION

This application claims priority from U.S. Provisional Patent Application Ser. No. 60/147,483 filed Aug. 9, 1999 titled Corner Mounting Bracket.

FIELD OF THE INVENTION

This invention relates to a telescoping corner mounting bracket which enables articles such as the head of a trophy animal to be mounted for display in a corner of a room rather than the more common location which is on a face of a wall remote from the corner.

BACKGROUND OF THE INVENTION

Heretofore, articles such as hunting trophies, speakers, tall mirrors, hanging planters, etc., have been displayed by mounting on a wall of a room usually at a location away from a corner. Such location is often determined by the wall construction since such articles can be quite heavy. Since the locations for displaying the article on a wall under these circumstances are limited, the article often may not be viewed to its best advantage or it may appear as being intrusive within the confines of the room.

It is, therefore, an object of this invention to provide a means for mounting an article at the concave convergence, that is, the inside corner, of two walls of a room, where construction of the convergence provides ample support for the article and where the article will not appear to be intrusive. A further object is to provide a means integral with the mounting bracket which ensures that an article is mounted upright.

Applicant is aware of U.S. Pat. No. 5,094,421, which issued Mar. 10, 1992 to Zaccone for a Corner Hangar. Zaccone discloses a base plate having side flanges which extend thereform at 45 degrees. The base plate cuts across the corner and the side flanges engage the two walls of an inside corner. With this design the base plate is positioned outwardly from the wall joint. A hangar arm, with outwardly projecting tabs at one end, is mounted to the base plate by slipping the tabs into corresponding slots formed in the base plate.

The Applicant is further aware of U.S. Pat. No. 4,049,225, which issued Sep. 20, 1977 to Chasen and Einhorn for a Mounting Bracket Having Hinged Base. Chasen and Einhorn disclose a hangar arm and one hinge arm which are integrally formed by a method such as casting. A second hinge arm is then attached to the hangar and hinge. The hinge arrangement permits the hangar to be mounted to flat, curved or angular surfaces. This mounting bracket is not capable of being mounted to an inside corner.

The Applicant is aware of U.S. Pat. No. 4,464,440, which issued Aug. 7, 1984 to Dotzman for a Trophy Mount. Dotzman discloses a replica animal head to which antlers, which have been previously removed from the skull of an animal, can be mounted. The replica head is attached to a plaque by a brace and the plaque may be either wall or table mounted.

What is neither taught nor rendered obvious from the prior art, and which is an object of the present invention, is a telescoping mounting bracket which enables a bulky, and often heavy, article to be mounted for display in a corner of a room.

SUMMARY OF THE INVENTION

In summary, the corner mounting bracket of the present invention includes a V-shaped elongate base for mounting snugly into an inner corner of a room and a rigid cantilevered member rigidly mounted to the base. The base is elongate between first and second opposite ends. It is generally V-shaped in cross-section perpendicular to a longitudinal axis of the base extending along a vertex of the V-shape. The rigid cantilevered member is rigidly mounted to the base adjacent the first end of the base so as to extend therefrom generally perpendicularly to the longitudinal axis and so as to bisect the V-shape. A distal end of the cantilevered member is adapted for hanging articles therefrom.

In one aspect of the present invention the cantilevered member comprises first and second rigid telescopic members. The first member is hollow and rigidly mounted at one end thereof to the base. The second member is slidibly telescopically mounted to the first member. The distal end of the second member may be the distal end of the cantilevered member.

Advantageously a mounting plate is rigidly mounted generally vertically across the distal end of the second member. It may be aligned orthogonally relative to a longitudinal axis of the second member. The mounting plate may include a lip extending out of a plane containing the mounting plate. The lip may be oriented, when the mounting plate is mounted to the distal end of the second member, so as to extend away from the second member. The lip may extend along a lower edge of the mounting plate.

In one embodiment, the longitudinal axis of the second member is collinear with a longitudinal axis of the first member, and the longitudinal axis of the first member intersects the longitudinal axis of the base. The longitudinal axis of the base may be an axis of symmetry of the base.

The base may comprise first and second rigid flanges mounted to each other along corresponding edges thereof. The corresponding edges form a seam along the vertex of the V-shape. The first and second flanges advantageously have mounting apertures therein for receiving therethrough threaded mounting members such as bolts etc. for threaded engagement with the inner corner so as to mount the base to the inner corner.

In a further aspect, selective adjustment means for adjusting the extension of the cantilevered member are provided, mounted or mountable to the first and second rigid telescopic members for selective adjustment of telescopic extension of the second member relative to the first member. The selective adjustment means may comprise a rigid elongate member such as a pin or bolt, etc. for mounting through alignable adjustment apertures in the first and second members when the adjustment apertures are aligned by selective telescopic sliding of the second member relative to the first member.

DETAILED DESCRIPTION OF PREFERRED EMBODIMENTS

Figure 1:
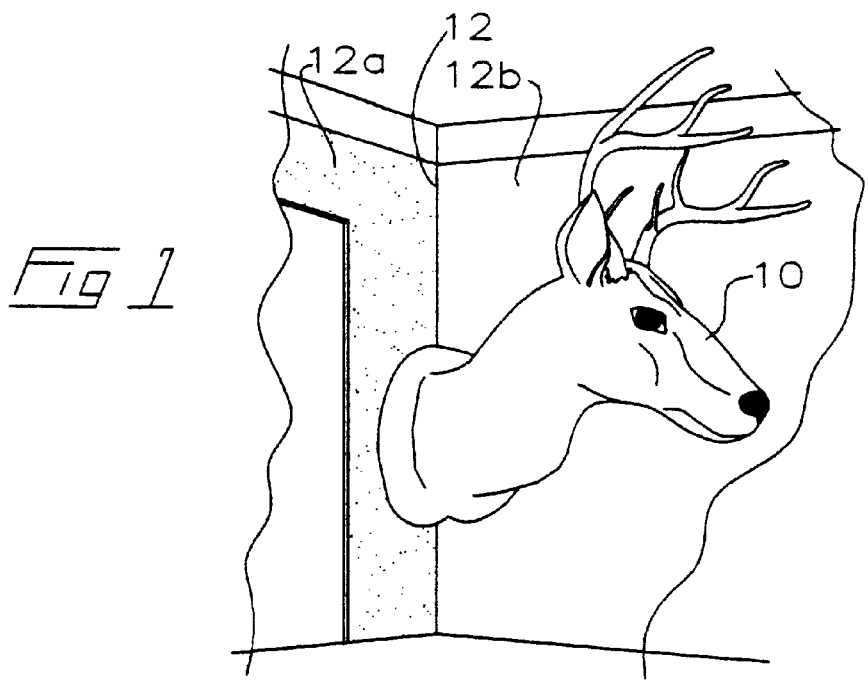
FIG. 1 is a perspective view of a trophy head mounted using the corner mounting bracket of the preset invention.
Figure 2:
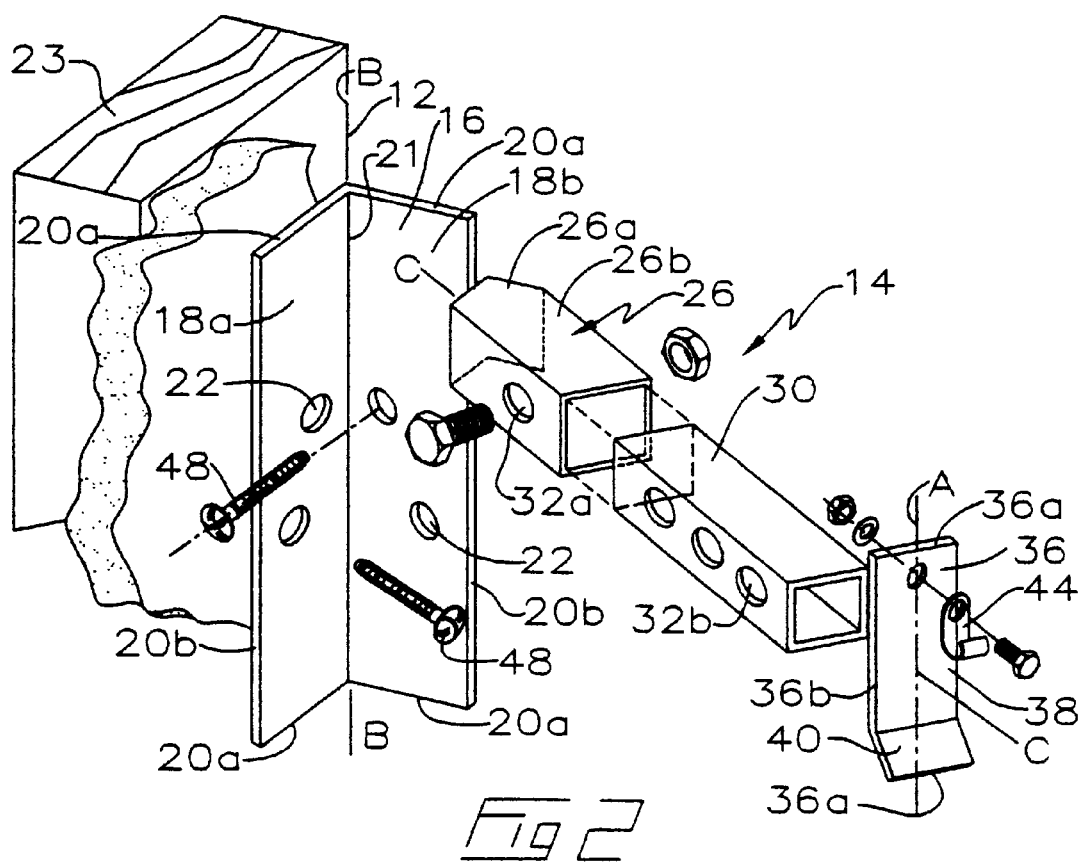
FIG. 2 is a perspective exploded view of the corner mounting bracket of the present invention.
Figure 3:
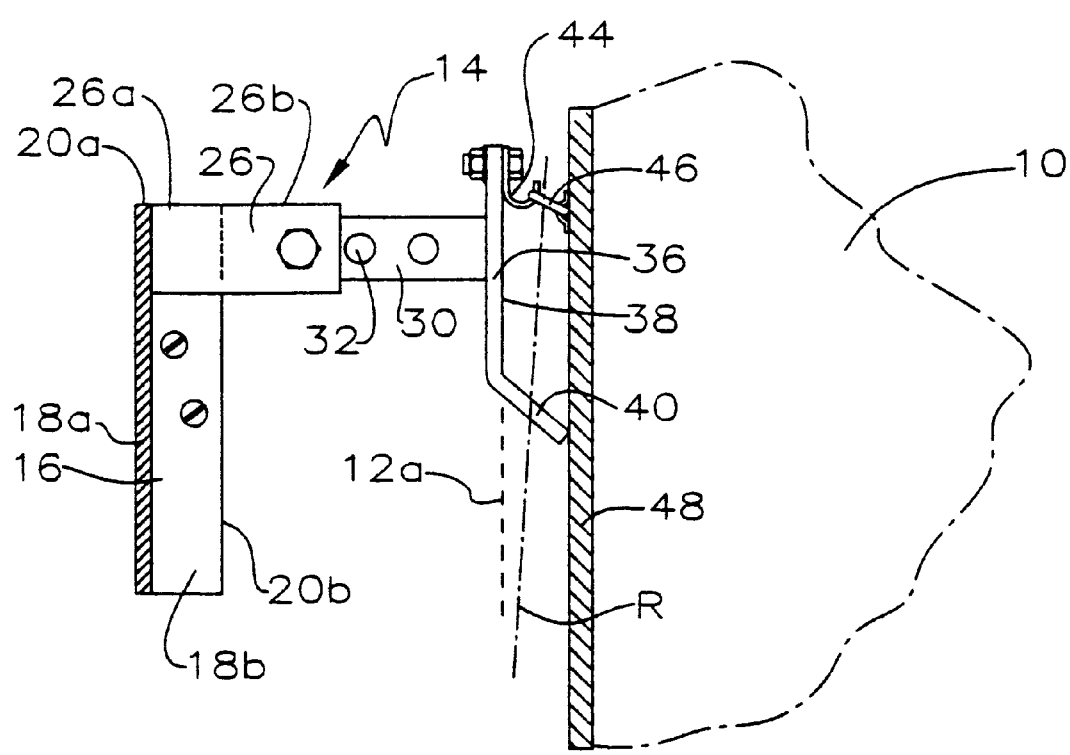
FIG. 3 is a side elevation view, partially in section, of the bracket of the present invention and a trophy mounting arrangement.

As is illustrated in FIGS. 1–3, a trophy head 10 is mounted for display snugly within inside corner 12, that is, within the convergence of walls 12a and 12b of a room.

Although a trophy head is illustrated, it is not intended to be limiting and as such is representative of other bulky, often heavy, articles such as audio speakers, televisions, picture frames, tall mirrors, hanging planters, etc. When appropriately sized, the corner bracket of the present invention may also be used to suspend smaller bulky items such as collectible plates, plaques, etc.

Advantageously, inside corner 12 has an included angle of generally 90 degrees between abutting walls. Mounting bracket 14 has a base 16. Base 16 is adapted to fit snugly within corner 12. The base 16 may be formed from, for example, angle iron material and has first and second orthogonal flanges 18a and 18b. First edges 20a of the flanges are a short length compared to the length of second edges 20b. The flanges may be generally rectangular. First and second flanges 18a and 18b respectively are joined together along seam 21. The flanges have a plurality of apertures 22 to facilitate mounting of base 16 within corner 12 by screws or the like journalled through the apertures so as to engage the wood studs 23 in the walls adjacent corner 12.

A hollow receiver tube 26 advantageously has a generally hollow square cross-section. End 26a is shaped to fit snugly when rigidly mounted, as by welding, to base 16 within the included angle between the flanges 18a and 18b. Seam 21 extends along longitudinal axis B at the intersection of flanges 18a and 18b. Tube 26 extends generally perpendicularly outwardly from seam 21 so as to bisect the V-shaped cross-section of base 16 formed by flanges 18a and 18b. Tube 26 is advantageously mounted so that upper surface 26b is adjacent or contiguous with a first end of base 16, where the first end of base 16 is the uppermost end of base 16 when base 16 is affixed to walls 12a and 12b in corner 12.

Tube 30 telescopically slides snugly within tube 26. Apertures 32a formed in tube 26 correspond to apertures 32b formed in tube 30. Tubes 30 and 26 have collinear longitudinal axes C. When aligned through telescopic movement of tube 30 relative to tube 26, corresponding apertures 32a and 32b accept a bolt therethrough, thereby fixing the combined length of the cantilevered projection of the tubes from base 16.

A generally rectangular support plate 36 is mounted to the distal end of tube 30. Plate 36 may have first parallel edges 36a generally matching the width of upper surface 26b of tube 30, second parallel elongate edges 36b, a planar face 38 and inclined section 40 inclined relative to face 38. Second edges 36b may be longer than first edges 36a. Inclined section 40 is formed contiguously with face 38 along a seam spaced from, and parallel to, first edges 36a. Inclined section 40 may advantageously be inclined 40 degrees from the longitudinal axis A of face 38.

Support plate 36 is mounted onto tube 30 by welding or the like. Plate 36 is secured to the distal end of tube 30, opposite from the telescopic mounting of tube 30 into tube 26. When mounting bracket 14 is mounted in corner 12, face 38 of support plate 36 is vertically oriented on the end of tube 30. The end of tube 30 may be positioned centrally on the rear face of plate 36. Inclined section 40 extends outwardly from support plate 36 on the side opposite to tube 30. A hook 44 is secured to the plate 36 by bolting or the like, adjacent the upper edge 36a. A trophy head or other article may be suspended using hook 44. Inclined section 40 is not required if it is not desired that the suspended article be vertical, assuming the article has a flat rigid backing to press against inclined section 40 which will not always be the case.

In the case of a trophy head, a ring 46 or the like is typically provided near an upper edge of a back plate 48 of the mounted trophy head 10. If the mounted trophy head 10 is suspended by ring 46 on to a hook or the like secured directly to wall 12a in room, the trophy head will have a tendency to rotate slightly downwardly toward that wall, as illustrated by line R in FIG. 3, until the bottom surface of back plate 48 engages wall 12a. The downward tilt of the mounted trophy head is undesirable as it is detracts from the lifelike appearance of the trophy. With the present invention downward rotation is inhibited since back plate 48 is maintained in a substantially vertical position by the outward protrusion of inclined section 40.

The corner mount of the present invention takes advantage of the fact that wall construction in frame dwellings provides supporting members such as wood studs 23 in the corners to which mounting bracket 14 can be secured. Should the mounting screws 48 or the like not engage the supporting members, the outward rotational moment on the bracket caused by trophy bead 10 causes a shearing force at an angle to the longitudinal axes of the mounting screws 48. Screws 48 are thus less likely to pull axially outwardly away from the walls. The use of elongate base 16 extending downwardly from tube 26 also helps resist the bending moment from the weight of the article cantilevered on the distal end of tube 30. Thus the load is taken up in shear on screws 48, reducing their tendency to pull out along their longitudinal axes.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A corner mounting bracket comprising:
   a V-shaped elongate base for mounting snugly into an inner corner of a room, said base elongate between first and second opposite ends and generally V-shaped in cross-section perpendicular to a longitudinal axis of said base extending along a vertex of said V-shape, said vertex of said V-shape for snug mounting against a corresponding vertex of the inner corner of the room so as to dispose sides of said V-shape into close adjacency with studs in walls adjacent the inner corner,
   a rigid cantilevered member rigidly mounted to said base adjacent said first end of said base so as to extend therefrom generally perpendicularly to said longitudinal axis and so as to bisect said V-shape, a distal end of said cantilevered member adapted for hanging articles therefrom.

2. The corner mounting bracket of claim 1 wherein said cantilevered member comprises first and second rigid telescopic members, said first member hollow and rigidly mounted at one end thereof to said base, said second member slidably telescopically mounted to said first member, wherein a distal end of said second member, distal to an end of said second member telescopically mounted to said first member, is said distal end of said cantilevered member.

3. The corner mounting bracket of claim 2 wherein a mounting plate is rigidly mounted generally vertically across said distal end of said second member, aligned orthogonally relative to a longitudinal axis of said second member.

4. The corner mounting bracket of claim 3 wherein said longitudinal axis of said second member is collinear with a longitudinal axis of said first member, and wherein said longitudinal axis of said first member intersects said longitudinal axis of said base.

5. The corner mounting bracket of claim 3 wherein said mounting plate includes a lip extending out of a plane containing said mounting plate, said lip oriented, when said mounting plate is mounted to said distal end of said second member, so as to extend away from said second member.

6. The corner mounting bracket of claim 5 wherein said lip extends along a lower edge of said mounting plate.

7. The corner mounting bracket of claim 2 further comprising selective adjustment means mountable to said first and second rigid telescopic members for selective adjustment of telescopic extension of said second member relative to said first member.

8. The corner mounting bracket of claim 7 wherein said selective adjustment means comprises a rigid elongate member for mounting through adjustment apertures in said first and second members when said adjustment apertures are aligned by selective telescopic sliding of said second member relative to said first member.

9. The corner mounting bracket of claim 1 wherein said longitudinal axis of said base is an axis of symmetry of said base.

10. The corner mounting bracket of claim 1 wherein said sides of said base comprises first and second rigid flanges mounted to each other along corresponding edges thereof, said corresponding edges forming a seam along said vertex of said V-shape.

11. The corner mounting bracket of claim 10 wherein said first and second flanges have mounting apertures therein for receiving therethrough threaded mounting members for threaded engagement with said inner corner so as to mount said base to said inner corner.

12. A corner mounting bracket comprising:

a V-shaped elongate base for mounting snugly into an inner corner of a room, said base elongate between first and second opposite ends and generally V-shaped in cross-section perpendicular to a longitudinal axis of said base extending along a vertex of said V-shape, a rigid cantilevered member rigidly mounted to said base adjacent said first end of said base so as to extend therefrom generally perpendicularly to said longitudinal axis and so as to bisect said V-shape, a distal end of said cantilevered member adapted for hanging articles therefrom, wherein said cantilevered member comprises first and second rigid telescopic members, said first extend hollow and rigidly mounted at one end thereof to said base, said second member slidably telescopically mounted to said first member, wherein a distal end of said second member, distal to an end of said second member telescopically mounted to said first member, is said distal end of said cantilevered member, and wherein a mounting plate is rigidly mounted generally vertically across said distal end of said second member, aligned orthogonally relative to a longitudinal axis of said second member.

13. The corner mounting bracket of claim 12 wherein said longitudinal axis of said second member is collinear with a longitudinal axis of said first member, and wherein said longitudinal axis of said first member intersects said longitudinal axis of said base.

14. The corner mounting bracket of claim 12 wherein said mounting plate includes a lip extending out of a plane containing said mounting plate, said lip oriented, when said mounting plate is mounted to said distal end of said second member, so as to extend away from said second member.

15. The corner mounting bracket of claim 14 wherein said lip extends along a lower edge of said mounting plate.

* * * * *